INVENTOR
RONALD C. ROESCHLAUB
BY HIS ATTORNEYS
HARRIS, KIECH, RUSSELL & KERN

United States Patent Office 3,619,892
Patented Nov. 16, 1971

3,619,892
METHOD OF REPLACING DEFECTIVE SPARK PLUG HOLE THREADS
Ronald C. Roeschlaub, Los Angeles, Calif., assignor to Irontite Products Co. Inc., El Monte, Calif.
Filed Feb. 9, 1970, Ser. No. 9,518
Int. Cl. B23p 7/00
U.S. Cl. 29—401          4 Claims

ABSTRACT OF THE DISCLOSURE

A method of replacing defective threads in a spark plug hole in a cylinder head, or the like, including the steps of: reaming out the defective threads to form an enlarged hole; tapping the enlarged hole; threading into the tapped hole an annular insert which is threaded internally to receive a spark plug of the same size as the original hole; locking the annular insert against rotation; and deforming a sealing washer into sealing engagement with the outer end of the annular insert and the cylinder head. The annular insert is then ready to receive a spark plug of the same size as the original hole, the spark plug being seatable on the sealing washer to render the spark plug gas tight under all pressure conditions within the cylinder.

BACKGROUND OF INVENTION

The present invention relates in general to replacing defective threads in a spark plug hole in a cylinder head, or the like, if the original threads are stripped, or otherwise damaged to such an extent as to render them unusable. Replacing the defective threads of course, avoids the necessity for replacing the entire cylinder head, which is a relatively expensive part of the engine.

Conventionally, defective spark plug hole threads are replaced by reaming out the original hole to a larger diameter, tapping the enlarged hole, threading into the tapped hole an annular insert which is threaded internally to receive a spark plug of the same size as the original hole, and locking the annular insert against rotation, a spark plug of the same size as that threadable into the original hole then being threaded into the insert.

The foregoing process of replacing defective spark plug hole threads, including the annular insert and the locking means mentioned, are all disclosed in detail in Pat. No. 2,855,970, issued Oct. 14, 1958, to Robert Neuschotz, the pertinent disclosure of which is incorporated herein by reference.

One difficulty with the procedure and parts discolsed in the aforementioned patent is leakage between the cylinder head and the annular insert, especially in the vicinities of the circumferentially spaced, longitudinal keys serving to lock the annular insert against rotation.

SUMMARY AND OBJECTS OF THE INVENTION

In the light of the foregoing background, a primary object of the invention is to completely eliminate any possibility of leakage between the annular insert and the cylinder head under all pressure conditions within the cylindner, so that the completed spark plug installation is gas tight.

More particularly, an important object of the invention is to deform a sealing washer into sealing engagement with the outer end of the annular insert and the cylinder head, after driving the keys which lock the annular insert against rotation, but before making the final spark plug installation. Deforming the sealing washer, which is preferably made of a soft metal, such as aluminum, into engagement with the upper end of the annular insert and the cylinder head in this fashion provides a completely gas tight seal against leakage between the annular insert and the cylinder head, which is an important feature of the invention.

Another object of the invention is to ream the spark plug hole in such a manner as to insure gas tight engagement between the deformed sealing washer and the cylinder head.

An additional object of the invention is to provide a method wherein the reaming step involves reaming out a further enlarged seat at the outer end of the enlarged hole, the deforming step then involving deforming the sealing washer into sealing engagement with the outer end of the annular insert and the further enlarged seat mentioned.

Other objects of the invention are to provide a method wherein the sealing washer is deformed as out-lined above by threading a suitable tool into the annular insert and against the sealing washer, such tool either being a spark plug, or a special tool for the purpose.

The foregoing objects, advantages, features and results of the present invention, together with various other objects, advantages, features and results of the invention which will be evident to those skilled in the art in the light of this disclosure, may be achieved with the exemplary embodiments of the invention illustrated in the accompanying drawing and described in detail hereinafter.

DESCRIPTION OF EXEMPLARY EMBODIMENTS OF INVENTION

Figure 1:
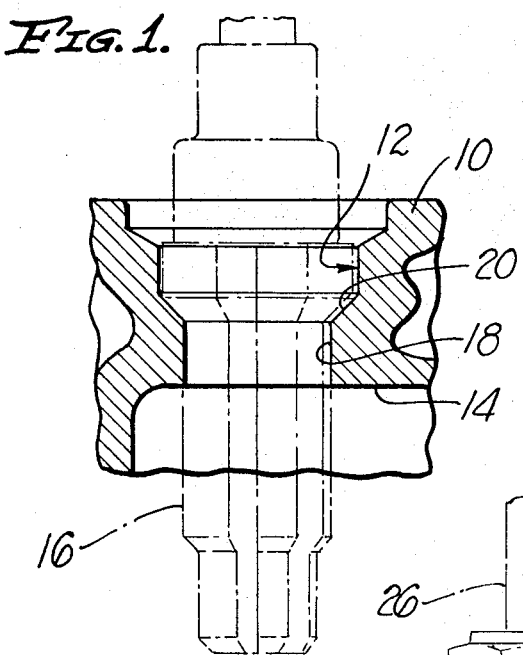
FIG. 1 is a longitudinal sectional view illustrating the step of reaming out a spark plug hole having defective threads therein to form an enlarged hole and a further enlarged seat at the outer end of the enlarged hole.
Figure 2:
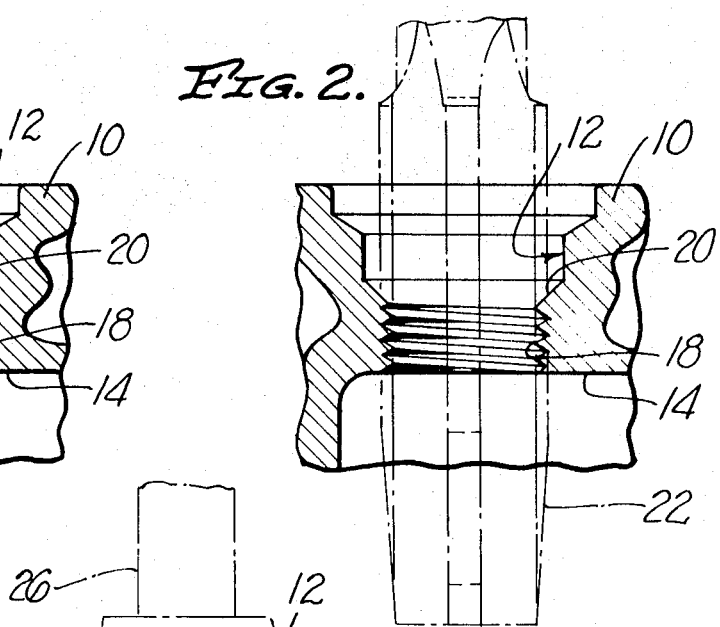
FIG. 2 is a view similar to FIG. 1 but showing the step of tapping the enlarged hole to form new threads therein.
Figure 3:
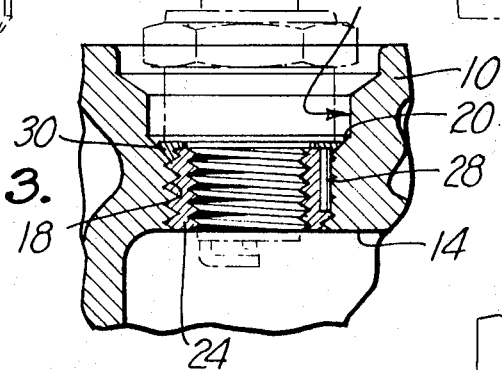
FIG. 3 is a view similar to FIG. 2, but showing a spark plug in use to deform a sealing washer into sealing engagement with the cylinder head and the outer end of an annular insert threaded into the enlarged, tapped hole and locked against rotation therein.

Referring initially to FIGS. 1 to 3 of the drawing, fragmentarily illustrated therein is a cylinder head 10 having therein a spark plug recess 12. Originally, the recess 12 communicated with a combustion chamber 14 within the head 10 through a threaded spark plug hole, not shown, the threads of which were damaged. FIGS. 1 to 3 illustrate successive steps in the method of the invention of replacing such damaged threads.

More particularly, FIG. 1 shows, in broken lines, a reamer 16 as having reamed out the damaged threads and as having formed an enlarged hole 18 provided at its outer end with a further enlarged, inwardly convergent seat 20.

Referring to FIG. 2, illustrated therein, again in broken lines, is tap 22 which is shown as having formed new threads in the enlarged hole 18.

The next step of the process of the invention is to thread into the enlarged, tapped hole 18 an annular insert 24, FIG. 3, which is threaded internally to receive a spark plug 26 of the same size as the original spark plug hole. In other words, if the original spark plug hole was intended to receive a 14 mm. spark plug, the annular insert 24 is also sized and threaded internally to receive a 14 mm. spark plug.

The annular insert 24 is threaded into the enlarged, tapped hole 18, and is locked therein against rotation, in the manner and with the means fully described in the aforementioned patent. The means for locking the annular insert 24 against rotation comprises a plurality of circumferentially spaced, longitudinally extending keys which interrupt the external threads on the annular insert and the internal threads in the enlarged hole 18. One of these keys is visible in FIG. 3 and is designated by the numeral 28. Since the manner of installing the annular insert 24 and the manner of installing the keys 28 are fully described in the aforementioned patent, no further description herein is necessary.

After the annular insert 24 has been threaded into the enlarged, tapped hole 18 and has been locked against rotation therein in the manner described in the aforementioned patent, a deformable sealing washer 30 of a material such as that hereinbefore specified, is inserted into the annular seat 20. The inside and outside diameters of the sealing washer 30 are sufficient that, when the sealing washer is compressed, it will deform into sealing engagement with both the outer end of the annular insert 24 and the annular seat 20 in the cylinder head 10.

The next step is to compress or deform the sealing washer into sealing engagement with the outer end of the annular insert 24 and the annular seat 20. This can be done conveniently with the spark plug 26, making certain to remove the usual spark plug gasket, not shown, with which it is normally equipped. The spark plug 26 is tightened sufficiently to deform the sealing washer 30 into sealing engagement with the outer end of the annular insert 24 and with the annular seat 20, as shown in FIG. 3. The annular insert 24 is now positively sealed against external leakage between it and the cylinder head 10, which is the important feature of the invention.

Upon removal of the spark plug 26 used for compressing the sealing washer 30, the thread replacement process is complete and the spark plug which is to be used with the particular cylinder involved can then be installed in the usual manner.

Figure 4:
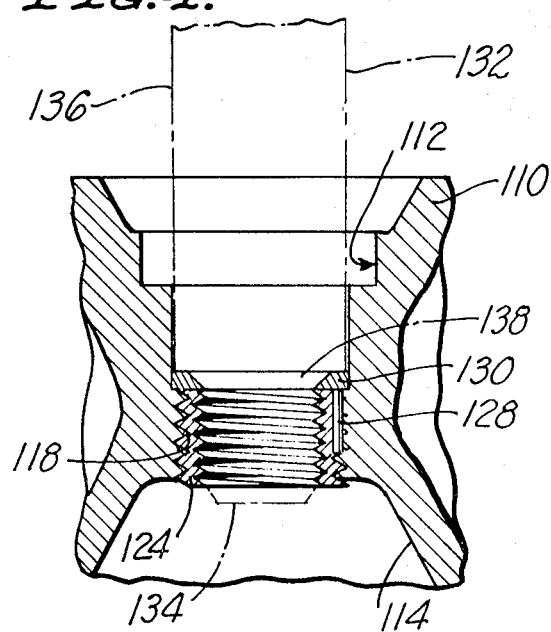
FIG. 4 is a view similar to FIG. 3, but showing a somewhat different enlarged, tapped hole, and showing the use of a special tool to deform the sealing washer into sealing engagement with the cylinder head and the outer end of the annular insert.
Figure 5:
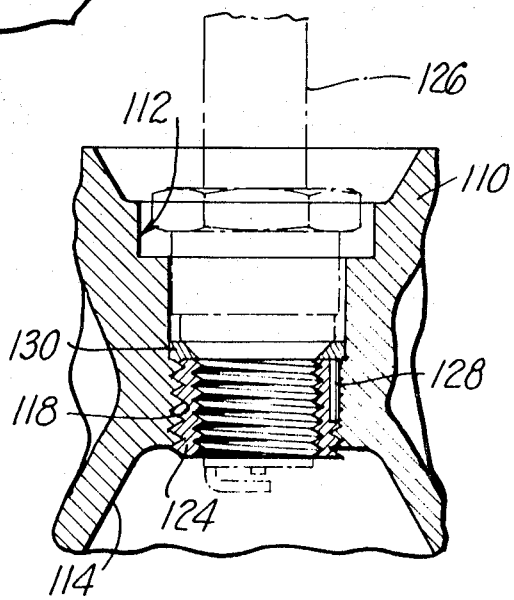
FIG. 5 is a view similar to FIG. 4, but showing a completed spark plug installation, the annular insert having threaded thereinto a spark plug of the same size as that threaded into the original spark plug hole.

Turning to FIGS. 4 and 5 of the drawing, the method of the invention is illustrated therein in conjunction with a cylinder head 110 and a spark plug 126 without the reamed annular seat 20 previously discussed. More particularly, the original spark plug hole extending from a spark plug recess 112 to a combustion chamber 114 has been reamed out to form an enlarged hole 118, in the same manner as illustrated in FIG. 1, but without any tapered annular seat corresponding to the annular seat 20. The enlarged hole 118 is then tapped in the same manner as shown in FIG. 2, to receive an annular insert 124 which is secured against rotation by circumferentially spaced, longitudinally extending keys, one of which is designated by the numeral 128. In this installation, the spark plug 126 may typically be an 18 mm. plug.

After installation of the annular insert 124 and the locking keys 128, a sealing washer 130, corresponding to the sealing washer 30, is inserted into engagement with the wall of the recess 112 and the outer end of the annular insert 124. This sealing washer is then compressed or deformed into sealing engagement with and seated against the wall of the recess 112 in the cylinder head 110 and with the outer end of the annular insert 124, using a special tool 132. This tool has a threaded pilot 134 which is threadable into the annular insert 124, the body 136 of the tool 132 fitting into the inner end of the spark plug recess 112 fairly closely. The tool 132 is provided with a convergent portion 138 connecting the tool body 136 to the threaded pilot 134.

After the sealing washer 130 has been deformed, as shown in FIG. 4, the tool 132 is removed and replaced by the desired spark plug 126, thereby finishing a completely gas tight installation.

Although exemplary embodiments of the invention have been disclosed herein for purposes of illustration, it will be understood that various changes, modifications and substitutions may be incorporated in such embodiments without departing from the spirit of the invention as defined by the claim which follow.

I claim as my invention:

1. A method of replacing defective threads in a spark plug hole in an engine part, including the steps of:
    (a) reaming out the defective threads, thereby forming an enlarged hole;
    (b) tapping new threads in the enlarged hole;
    (c) threading into the tapped, enlarged hole an annular insert which is threaded internally to receive a spark plug of the same size as the original hole;
    (d) locking the annular insert against rotation; and
    (e) deforming a sealing washer into sealing engagement with and seating it against the outer end of the annular insert and the engine part.

2. A method as set forth in claim 1 wherein the sealing washer is deformed by threading a tool into the annular insert.

3. A method according to claim 2 wherein the sealing washer is deformed by threading a spark plug into the annular insert.

4. A method as defined in claim 1 wherein the reaming step involves reaming out a further enlarged seat at the outer end of the enlarged hole, and wherein the deforming step involves deforming the sealing washer into sealing engagement with the outer end of the annular insert and said further enlarged seat.

References Cited

UNITED STATES PATENTS

| | | | |
|---|---|---|---|
| 1,832,713 | 11/1931 | Leinau | 29—DIG 34 |
| 2,855,970 | 10/1958 | Neuschotz | 151—23 |
| 2,951,506 | 9/1960 | Diperstein | 29—402 X |

JOHN F. CAMPBELL, Primary Examiner

D. C. REILEY, Assistant Examiner

U.S. Cl. X.R.

29—DIG 34; 151—23